Figure 1:
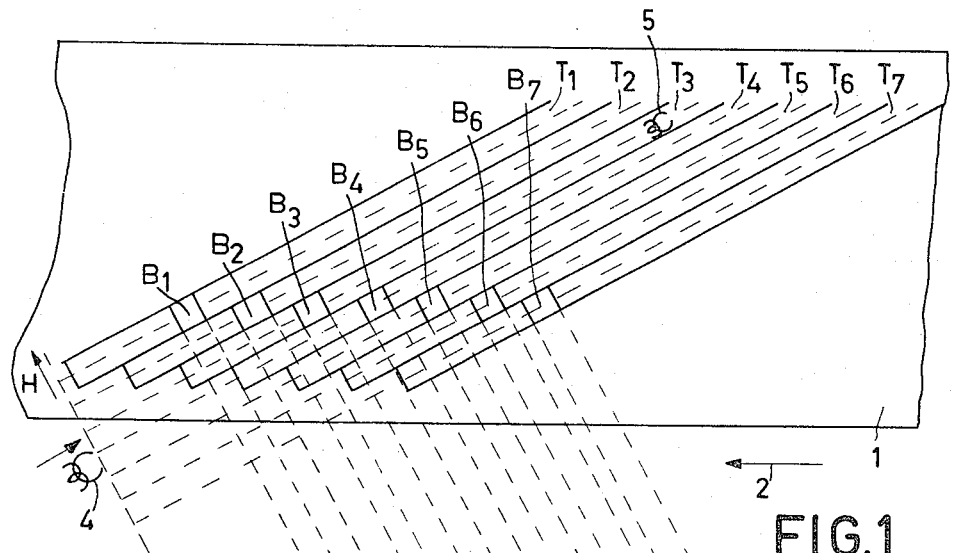

United States Patent [19]

Sanderson

[11] 4,303,953

[45] Dec. 1, 1981

[54] METHOD OF POSITIONING REPRODUCING ELEMENTS AND DEVICE FOR CARRYING OUT THE METHOD

[75] Inventor: Hendrik J. Sanderson, Eindhoven, Netherlands

[73] Assignee: U.S. Philips Corporation, New York, N.Y.

[21] Appl. No.: 58,577

[22] Filed: Jul. 18, 1979

[30] Foreign Application Priority Data

Aug. 22, 1978 [NL] Netherlands ................ 7808639

[51] Int. Cl.³ .................. G11B 21/10; G11B 21/12
[52] U.S. Cl. ............................ 360/78; 360/77
[58] Field of Search ........................ 360/77, 78

[56] References Cited

U.S. PATENT DOCUMENTS 4,120,008 10/1978 Metzger et al. ............... 360/77
4,141,048 2/1979 Kubota et al. ............... 360/77

FOREIGN PATENT DOCUMENTS 2722977 11/1978 Fed. Rep. of Germany ........ 360/77

*Primary Examiner*—Robert S. Tupper

*Attorney, Agent, or Firm*—Thomas A. Briody; William J. Streeter; Algy Tamoshunas

[57] ABSTRACT

In video recorders where the video information is alternately recorded in oblique tracks by means of two heads, there are generally provided fine control mechanisms for centering the heads relative to the track to be followed. These mechanisms do not detect whether the two heads occupy a correct position relative to each other so that their position relative to each other may differ by an amount corresponding to one track or a group of tracks. The disclosed method of controlling the two heads so that they occupy a correct position relative to each other assumes the use of a recording medium with signals reproduced by the heads contain pilot signals such that in the case of a correct reading of two consecutive tracks, the detected pilot signals are spaced at a nominal time interval from each other, i.e. half the revolution period of the head disk. The time interval between the detection of two consecutively pilot signals is measured and if that time interval deviates from the nominal time interval by a predetermined amount, the position of the two heads relative to each other in a direction transverse to the recording tracks is corrected.

18 Claims, 7 Drawing Figures

METHOD OF POSITIONING REPRODUCING ELEMENTS AND DEVICE FOR CARRYING OUT THE METHOD

The invention relates to a method of positioning reproducing elements in an apparatus for reproducing signals which have been recorded on a recording medium in the form of a tape in accordance with recording tracks which are disposed substantially parallel to each other and obliquely relative to the longitudinal axis of the recording medium. In such an apparatus, two reproducing elements alternately read the tracks consecutively. The position of the elements with respect to each other is controllable in a direction transverse to the recording tracks and the reproduced signals contain pilot signals such that if each pair of recording tracks is read correctly, the pilot signals are then situated at the same nominal time interval.

Such a method is known from the Netherlands patent application No. 7409513, which has been laid open for public inspection. In apparatus in which information is recorded in adjacent tracks on a record carrier and subsequently read, in particular apparatus for recording and reproducing video signals of the type in which the record carrier is passed around a drum in accordance with a helix and is scanned by a rotary head, the read head should precisely follow the desired track during reading. This is particularly desirable since, in order to increase the information density, the distance between the tracks is reduced more and more and the tracks are even written so as to directly adjoin each other without any intermediate spacing. At the same time the width of the tracks is reduced more and more and track widths of approximately 30 μm are already used, the tendency being to reduce this already extremely small track width even further. A slight deviation of the read head from the correct track then directly results in impermissible crosstalk of information from the adjacent track.

In accordance with this known method, the pilot signals recorded in the tracks are read and used for controlling the position of the reproducing elements relative to the centre of the track which is being read by the relevant reproducing element.

A drawback of this known method is that the positional error may correspond to a full track, or in cases that within a group of tracks the pilot signals can be discriminated from each other to a specific number of tracks, without this being detected. When the known method is used it may then happen that a reproducing element is controlled so as to be centred relative to a wrong track.

It is the object of the invention to provide a method of positioning the reproducing elements relative to each other in such a way that they scan consecutive tracks.

To this end the invention is characterized by the detection of the pilot signals in the reproduced signals, the measurement of the time between the appearance of the pilot signals in each pair of consecutively read recording tracks, and the correction of the position of the two reproducing elements relative to each other in a direction transverse to the recording tracks if this measured time deviates from a predetermined nominal time to a predetermined extent.

The invention is based on the recognition that, as the tracks are disposed obliquely on the tape, the difference in time between two consecutively read pilot signals depends on the number of tracks situated between two consecutively read tracks, the nominal time corresponding to the time difference between the consecutive reading of two tracks which directly adjoin each other on the tape. In the case of a two-head video recorder, this time difference is equal to half the revolution time of the head drive and to the duration of one video field. The pilot signals in the tracks may then be signals which are independent of and distinguishable from the information signal or, alternatively, they may also be, for example, the vertical synchronizing pulses.

In respect with the measurement of the time difference, the method in accordance with the invention may further be characterized by the measurement of the duration of a first time interval between a first reference instant and the detection of the appearance subsequent thereto of a pilot signal, the measurement of the duration of a second time interval between a second reference instant, which differs from the first reference instant by the predetermined nominal time, and the detection of the appearance subsequent thereto of a pilot signal, and the determination of the difference between the durations of the first and the second time interval.

In this way the full time between the appearance of two consecutive pilot signals need not be measured.

In respect to the generation of control signals, the method in accordance with the invention may further be characterized by the generation of a first signal when the difference between the durations of the first and the second time interval exceeds a predetermined magnitude, and the generation of a second signal which represents the sign or polarity of that difference.

The invention also relates to a device for carrying out the method comprising a first and a second reproducing element for reproducing signals, which have been recorded on a recording medium in the form of a tape in accordance with recording tracks which are disposed substantially parallel to each other and obliquely relative to the longitudinal axis of the recording medium, in that the first and the second reproducing element consecutively move in a direction oblique to the longitudinal axis of said recording medium, and comprising positioning means for controlling the position of the first and the second reproducing element relative to each other in a direction transverse to the direction of movement of said reproducing elements.

An embodiment of a device in accordance with the invention is characterized by a detection circuit for the detection of the appearance of pilot signals in the signals reproduced by the first and the second reproducing element, a measuring circuit for determining the time interval between the appearance of every two consecutive detected pilot signals, a comparator circuit for comparing the measured time interval with a predetermined nominal time, and a control circuit for applying a control signal to the positioning means when the measured time interval deviates from the nominal time to a predetermined extent.

In respect to the control circuit, the device in accordance with the invention may further be characterized in that the control circuit comprises an integrating element, signal means for the generation of a signal of a first level in the case of first polarity of the time error measured by the comparator circuit and of a second level if the time error measured by the comparator circuit has a polarity opposite to said first polarity, and switching means for the application of this signal to the integrating element when the time interval measured deviates from the nominal time to a predetermined extent.

Thus, a control signal is generated in an integrating manner, which signal continues to increase or decrease as long as a time error is detected and whose value is maintained as soon as the position of the two reproducing elements relative to each other is correct.

This embodiment may further be characterized in that the device comprises second switching means between the control circuit and the positioning means, which switching means are open during the time that the reproducing element controlled by said positioning means reproduces signals from a recording medium.

A suitable embodiment of the device in accordance with the invention may be characterized in that the detection circuit comprises a pulse shaper for shaping pulses in synchronism with the detected pilot signals, that the measuring circuit comprises a first pulse generator for the generation of pulses of which the time interval between the appearance of each time two consecutive pulses is equal to the said nominal time, and a circuit for measuring the difference between the duration of the first time interval between the appearance of a first pulse generated by the first pulse generator and a first pulse generated by the pulse shaper and the duration of the second time interval between the appearance of a second pulse subsequent to the first pulse generated by the first pulse generator and a second pulse subsequent to the first pulse generated by the pulse shaper.

In respect of the measuring circuit this embodiment of the device in accordance with the invention may further be characterized in that the measuring circuit comprises a counting pulse generator for the generation of counting pulses whose repetition frequency is comparatively high relative to the repetition frequency of the pulses from the first pulse generator, a gate circuit for transferring said counting pulses during the first and the second time interval, and a switchable counter for counting the counting pulses in a first counting direction during the first time interval and counting the counting pulses in a direction opposite to the first counting direction during the second time interval.

In accordance with a further characteristic feature of this embodiment of a device in accordance with the invention it is advantageous that the measuring circuit comprises a bistable circuit to whose set and reset inputs the pulses from the pulse shaper and from the first pulse generator are applied and an output signal of which controls the gate circuit.

In respect of the comparator circuit this embodiment of the device in accordance with the invention may further be characterized in that the comparator circuit comprises a decoding circuit for producing a first signal when the count of the counter upon termination of every second time interval deviates to a predetermined extent from a reference position, which is reached when the time interval between the appearance of two consecutive pilot signals is equal to the nominal time, and a second signal which represents the polarity of said deviation.

In respect of the application of the first and the second signal to the control circuit with the integrating element this embodiment may be characterized in that said first switching means are actuated by the first signal and that said signal means are controlled by the second signal.

As the count of the switchable counter continually changes during the counting cycle it may be advantageous that the comparator circuit comprises a memory circuit for receiving the values of the first and the second signal on command of clock pulses which each time appear upon termination of the second time interval, subsequently storing these values until the appearance of a subsequent clock pulse, and applying said stored values of the first and the second signal to the said first switching means and said signal means.

Owing to this a simple circuit may be selected for the decoding circuit, because its output signals are not taken over by the memory circuit until after termination of every counting cycle. If a pilot signal is not detected by the detection circuit, an incorrect error signal could be generated upon termination of the counting cycle. This may be prevented in that the switchable counter comprises a device for detecting whether the counting limits of the switchable counter are exceeded and for inhibiting the application of the next clock pulse to the memory circuit.

Indeed, if a pilot signal is not detected, the supply of counting pulses to the counter is not interrupted, which results in one of the two counting limits being exceeded.

Figure 2:
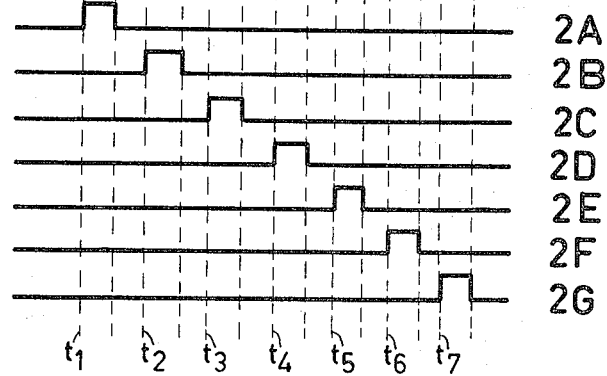
Figure 3:
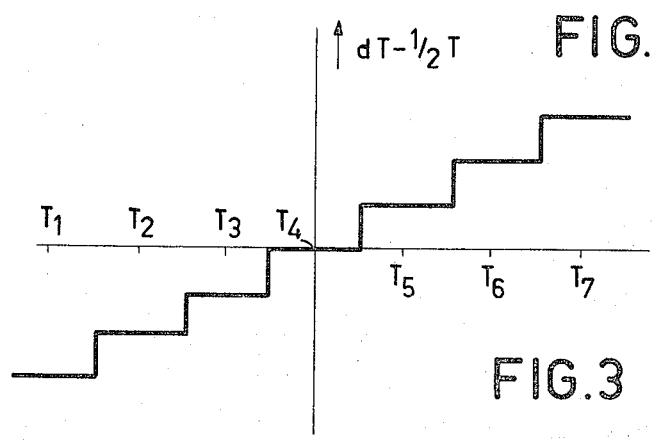
Figure 4:
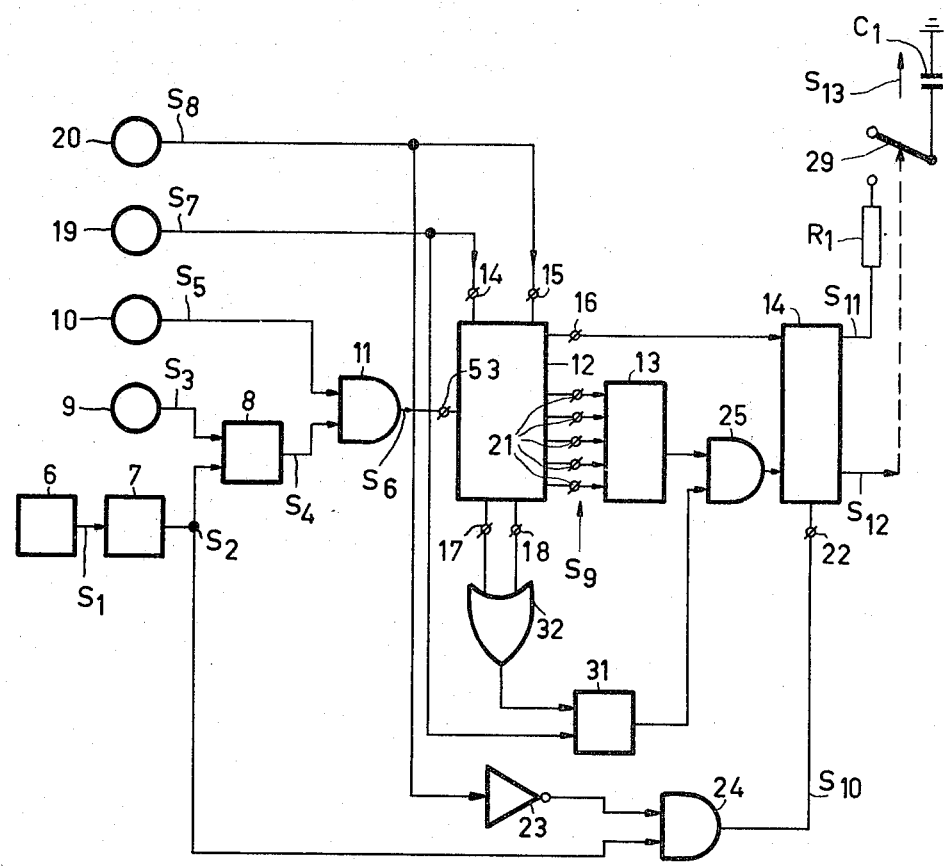
Figure 5:
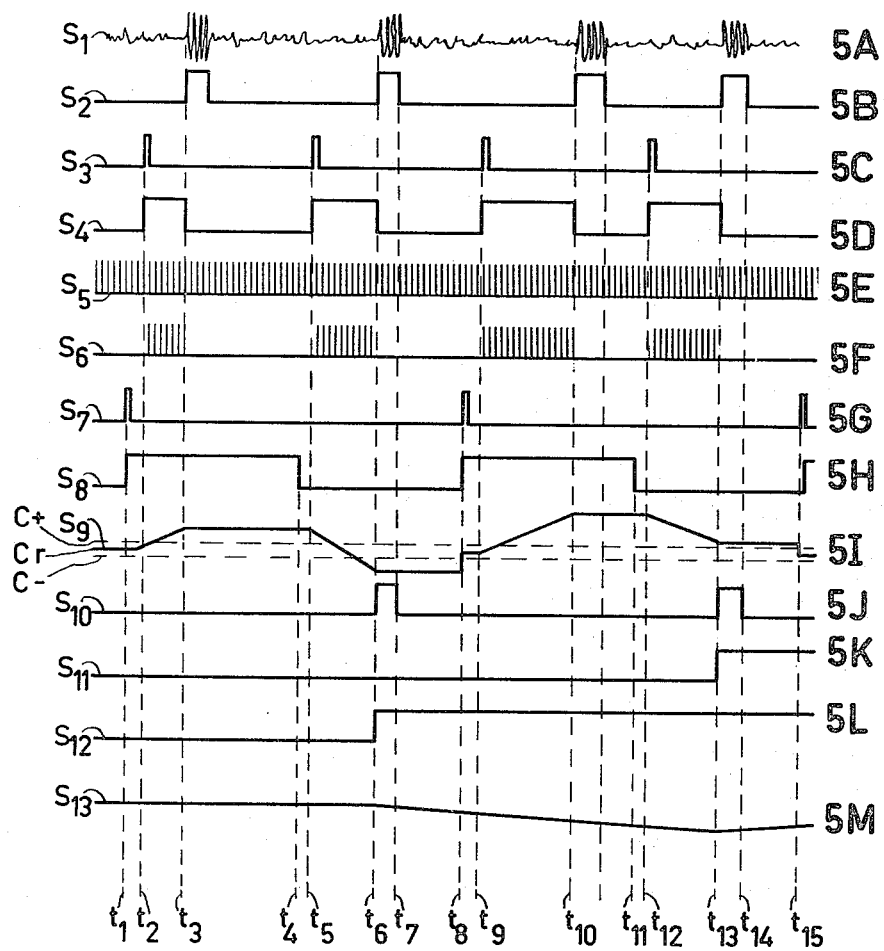
Figure 6:
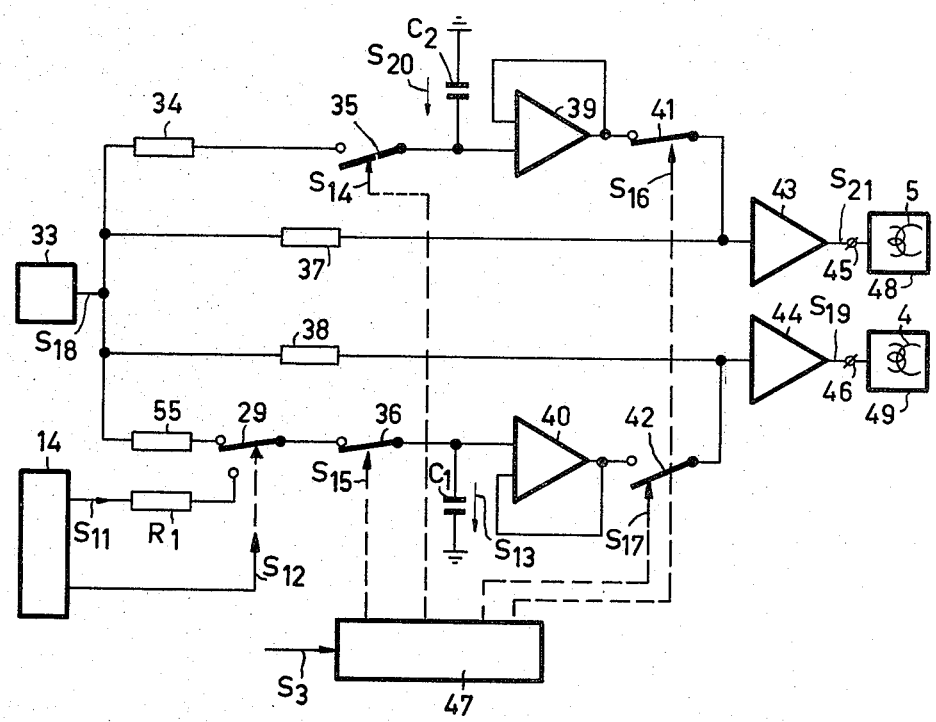

The invention will now be discribed in more detail with reference to the following Figures, of which:

FIG. 1 schematically shows a record carrier in the form of a tape with information tracks and pilot signals, FIG. 2 represents a time diagram of pilot signals read, FIG. 3 shows a diagram which represents the time error as a function of the tracking error, FIG. 4 shows an embodiment of a device in accordance with the invention, FIG. 5 shows a time diagram with a number of signal wave-forms to explain the operation of the device of FIG. 4, FIG. 6 shows an extension of the device of FIG. 4 in which the device in accordance with the invention cooperates with a device for positioning the reproducing elements on the centre of the tracks, and FIG. 7A–7I shows a time diagram with a number of signal waveforms to explain the operation of the device in accordance with FIG. 6.

FIG. 1 schematically shows a record carrier 1 in the form of a tape, which is assumed to move with uniform speed in direction of the arrow 2. Tape 1 passes around a drum along a helical path in a manner which is known but not shown. The drum accomodates two diametrically opposed magnetic heads 4 and 5 which via a gap in said drum can magnetically contact the magnetic tape 1. As the tape is passed halfway around the drum each head contacts the tape for half a revolution. In this way information can be written on the tape in tracks, the information tracks being disposed parallel to each other and obliquely relative to the tape axis. FIG. 1 schematically shows a number shown in tracks $T_1$ to $T_7$. In the situation of FIG. 1, the head 5 reads the track $T_3$. After the head 5 has reached the end of track $T_3$, head 4 should have arrived at the beginning of track $T_4$ in order to read this track consecutively with respect to the information read from track $T_3$.

As the tracks are not always entirely straight and also in order to enable continuous reading when the tape 1 is stationary so as to obtain still pictures, it is known to control the heads 4 and 5 in such a way relative to the information track that they always follow the centre of the information track. For this purpose a number of systems are known, inter alia the system described in the said Netherlands Patent Application. Generally these fine control systems cannot distinguish which track or which group of tracks is being followed. It is then possible that head 4 is offset in direction H relative to head 5 so that after head 5 has read track $T_3$ head 4 starts to read a track other than the track $T_3$ which follows track $T_4$. In accordance with the invention such an undesirable deviation can be detected by applying pilot signals to the information tracks which can be distinguished in amplitude, frequency and/or time from the information written in the tracks. The pilot signals should then always be situated at the same time interval from the beginning of the tracks and are preferably burst-shaped. In FIG. 1 these signal bursts are designated $B_1$ to $B_7$.

FIG. 2 shows a time diagram of the signals read by the head 4. In this diagram FIG. 2A to FIG. 2G, respectively, represent the burst signals read by the head 4 when that head reads the tracks $T_1$ to $T_7$ respectively. The burst signals are then read at the instants $t_1$ to $t_7$ respectively.

When head 5 has read track $T_3$, head 4 should read track $T_4$. The burst signal $B_4$ is then read at the instant $t_4$ which occurs exactly half a revolution period T after the burst signal $B_3$ is read by the head 5. If the head 4 reads a wrong track, the time difference dT between the appearance of the burst signal $B_3$ and the burst signal read by the head 4 is not equal to $\frac{1}{2}T$. From the deviation between the time difference dT and half the revolution period, a signal can be derived which is indicative of how many tracks the error of head 4 relative to head 5 corresponds. FIG. 3 schematically illustrates this difference $dT - \frac{1}{2}T$ as a function of the track read by the head 4.

FIG. 4 shows an example of a circuit for measuring the time difference $dT - \frac{1}{2}T$ and for deriving servo signals therefrom, whilst FIG. 5 shows a number of signal waveforms to explain the operation of the circuit of FIG. 4. The circuit comprises a device 6 for reading the signals recorded on the tape and thus comprises the two heads 4 and 5. The output signal $S_1$ of the device 6 is shown in FIG. 5A. In signal $S_1$, the burst signals appear at the instants $t_3$, $t_6$, $t_{10}$ and $t_{13}$, which in the present example differ from the rest of the signal $S_1$ in respect of the amplitude. The output of the device 6 is connected to the input of a pulse shaper 7, for example an a.m. demodulator in series with a threshold circuit for the formation of pulses, in the present example pulses of a duration equal to the duration of the burst signals. However, it is alternatively possible to form short pulses of constant duration in synchronism with the beginning or the end of the burst signals. The output signal $S_2$ of the pulse shaper 7 is shown in FIG. 5B.

In order to determine the time error $dT - \frac{1}{2}T$ the circuit comprises a pulse generator 9 which generates pulses at time intervals $\frac{1}{2}T$, i.e. once every half revolution. This pulse train $S_3$ is shown in FIG. 5C. For a correct measurement this pulse generator should be synchronized in such a way that under all practical conditions the pulses from the generator always precede (or always follow) the reading of the burst signals.

The signal $S_3$ is applied to the set input of a flip-flop 8 and the signal $S_2$ to the reset input of flip-flop 8. The output signal of flip-flop 8 is shown in FIG. 5D.

The difference in duration between two successive output pulses of the flip-flop 8 is now equal to the time error $dT - \frac{1}{2}T$ to be determined. As an example, the difference between the durations of the pulses appearing at the instants $t_2$ and $t_5$ is $(t_6 - t_5) - (t_3 - t_2)$. For the pulse train $S_2$ the expression $t_6 - t_3 = dT$ is valid and for the pulse train $S_3$ the expression $t_5 - t_2 = \frac{1}{2}T$, so that $(t_6 - t_5) - (t_3 - t_2) = dT - \frac{1}{2}T$.

In order to measure the time error the circuit comprises a generator 10 for the generation of counting pulses $S_5$ (FIG. 5E) of comparatively high frequency. These counting pulses $S_5$ together with the signal $S_4$ are applied to a gate circuit 11, in the present example an AND-gate. The output signal $S_6$ of the gate circuit 11 consequently consist of sets of counting pulses, each set having the same duration as the corresponding pulse of the signal $S_4$. In the present example the difference in duration of two consecutive pulses of the signal $S_4$ is determined by counting the difference of the number of counting pulses in the corresponding counting pulse sets of the signal $S_6$. This is achieved by means of an up/down counter 12, to whose count input 53 the signal $S_6$ is applied. A signal $S_7$ (FIG. 5G) from the generator 19 is applied to a reset input 14 of the up/down counter 12. This signal $S_7$ comprises one pulse per revolution, each time occurring prior to a first counting pulse set of two consecutive sets of the signal $S_6$ in order to ensure that the counter 12 is set to a reference position at the beginning of each counting cycle. A generator 20 supplies a squarewave signal $S_8$ (FIG. 5H) with a fundamental frequency equal to the repetition frequency of the reset pulses in the signal $S_7$ to a counting-mode input 15 of the counter 12. The edges of signal $S_8$ should always appear before the occurrence of a set of counting pulses in the signal $S_6$. Upon command of signal $S_8$, the counter 12 is always set to the count-up mode during the appearance of a counting pulse set in the signal $S_6$ and to the count-down mode during a successive counting pulse set, so that at the end of each counting cycle the count corresponds to the time error $dT - \frac{1}{2}T$.

On the counting outputs 21 of the counter 21 the count $S_9$ appears on the counting outputs 21 of the counter 12 and is represented symbolically as the signal shown in FIG. 5I. At the instant $t_1$ the counter is reset to its reference count $C_r$ on command of signal $S_7$ and in the present example the counter is simultaneously set to the count-up mode upon command of the signal $S_8$. At the instant $t_2$, i.e. when a pulse of the signal $S_3$ and consequently a counting pulse set of the signal $S_6$ appears, the count $S_9$ increases until at the instant $t_3$ a burst signal appears in the signal $S_1$ and the counter no longer receives any counting pulses. At the instant $t_4$ the counter is set to the count-down mode on command of the signal $S_8$ and at the instant $t_5$ the counter again receives counting pulses so that the count decreases until the instant $t_6$ upon the occurrence of a second burst signal in the counting cycle. The counting cycle is terminated at the instant $t_8$ when the counter is reset to its reference count $C_r$ on command of the signal $S_7$ and the counter is moreover reset to the count-up mode. Between the instants $t_9$ and $t_{10}$ the counter again receives counting pulses and the count increases. At the instant $t_{11}$ the counter is set to the count-down mode and between the instants $t_{12} - t_{13}$ the count decreases again as a result of the application of counting pulses. At the instant $t_{15}$ this counting cycle is terminated by the reset pulse.

The time error may be measured proportionally, i.e. a signal proportional to the time error is produced, but also in the same way as in the embodiment shown, where a signal is generated which indicates whether the mutual position of the heads is correct or incorrect, and for example deviates from the desired mutual head position by one track or a group of tracks. For this purpose the count $S_9$ is applied to a decoding circuit 13 which supplies an output signal, in the present example the logic state "1" when the count $S_9$ exceeds certain limits $C_+$ or $C_-$. In order to indicate the polarity of the deviation, the counter 12 has an output 16 with a signal which is in the logic "1" state if the time error is positive and in the logic "0" state when the time error is negative. If a n-bit up/down counter is used, i.e. with counts between 0 and $2^n-1$, and the value $C_r=2^{n-1}$ is selected as the reference value $C_r$, the most significant bit is indicative of the polarity of the time error.

From the diagram of FIG. 5 it appears that the count between the instants $t_6$ and $t_8$ and also between the instant $t_{13}$ and $t_{15}$ is representative of the time error. For reading these counts the circuit comprises a memory element 14, for example comprising two flip-flops, to the inputs of which are applied the output signal of the decoding circuit 13 and the signal from the output 16 of the counter 12. This memory circuit transfers these logic signals to outputs on which the signals $S_{11}$ and $S_{12}$ appear, as shown in FIGS. 5K and 5L. The state of the outputs of the memory circuit 14 can change only if a pulse appears on an input 22. For this purpose the inverted signal $S_8$ and the signal $S_2$ are applied to a gate circuit 24, in the present example an AND-gate. The output signal $S_{10}$ (FIG. 5J) of gate 24 is consequently "1" if counter 12 is in the count-down mode and a pulse of signal $S_2$ appears. Consequently, this is at the end of each counting cycle after the signal $S_2$ has suppressed the counting pulses $S_5$ at the instants $t_6$ and $t_{13}$.

In the present example the signals $S_{11}$ and $S_{12}$ are "0" at the beginning of the first counting cycle at the instant $t_1$. At the instant $t_6$ a pulse appears in the signal $S_{10}$. The time error is then negative, so that $S_{11}$ remains "0" and the count $S_9$ corresponding to this time error exceeds the limit $C_-$, so that signal $S_{12}$ becomes "1". At the instant $t_{13}$ upon the appearance of the pulse $S_{10}$ at the end of the second counting cycle the time error is positive and the corresponding count exceeds the limit $C_+$, so that the signal $S_{12}$ remains "1" and signal $S_{11}$ becomes "1".

The signals $S_{11}$ and $S_{12}$ are digital signals which represent the time error. In the example of FIG. 4 these signals are converted into an anolog servo signal. For this purpose the circuit comprises an integrating capacitance $C_1$, the voltage $S_{13}$ across capacitance $C_1$ being the servo signal for the head 4. The signal $S_{11}$ is applied to the capacitance $C_1$ via charging resistor $R_1$ and switch 29

If switch 29 is closed and signal $S_{11}$ is "1", the capacitance $C_1$ is charged, and if signal $S_{11}$ is "0" the capacitance $C_1$ is discharged.

Switch 29 is actuated by the signal $S_{12}$, in such a way that if the signal $S_{12}$ is "1", which corresponds to an incorrect position of the heads relative to each other, the switch is closed, and if signal $S_{12}$ is "0" this switch is open and the voltage $S_{13}$ does not change. The signal $S_{13}$ is shown in FIG. 5M, the capacitance $C_1$ being discharged between the instants $t_6$ and $t_{13}$, while at instant $t_{13}$, at which instant $S_{11}$ changes, the capacitance $C_1$ is charged again.

There is a possibility that as a result of certain disturbances, the pulse shaper 7 will not detect a burst signal. If this occurs the counter will keep receiving counting pulses for the rest of the counting cycle, so that one of the counting limits of the counter 12 will be exceeded. Although the position of the heads 4 and 5 relative to each other is correct, this would result in an error signal being generated and the heads being set to an incorrect position relative to each other. In order to prevent this, the counter 12 has outputs 17 and 18 which respectively become high if the upper or the lower counting limit is reached. These outputs are connected to an OR-gate 32 whose output becomes "1", if one of the two outputs 17 and 18 becomes "1", i.e. when one of the two limits of the counter 12 is exceeded. In the present example the output of OR-gate 32 is connected to the reset input of a flip-flop 31, whose set input receives the signal $S_7$. The output of flip-flop 31 leads to an input of an AND-gate 25, of which another input is connected to the output of the decoding circuit 13 and whose output is connected to the memory circuit 14.

If one of the limits of the counting range of counter 12 is exceeded, the output of gate 32 becomes "1" and flip-flop 31 is reset, so that its output becomes "0". As a result of this the output of gate 25 becomes "0" and upon the appearance of a pulse on input 22 of the memory circuit 14 the signal $S_{12}$ also becomes "0", so that switch 29 opens and the voltage $S_{13}$ no longer changes. After termination of the counting cycle in which the counting limits have been exceeded, the flip-flop 31 is set by the signal $S_7$ and the output of flip-flop 31 becomes "1". As a result of this the output signal of the decoding circuit 13 reaches the memory circuit 14 again and after the appearance of the next pulse on input 22 of the memory circuit 14 the signal $S_{12}$ again assumes a level which corresponds to the output signal of the decoding circuit 13.

The generators 9, 10, 19 and 20 may be synchronized in several different ways. In recorders provided with a tachogenerator coupled to the motor which rotates the heads 4 and 5, this may be effected by using, for the generators, oscillators which together with the tachogenerator are included in phase-locked loops. Alternatively, it is, for example, possible to synchronize the counting pulse generator 10 with the tacho-generator or with other available synchronizing signals and to derive the signals $S_3$, $S_7$ and $S_8$ therefrom, for example with the aid of counters.

As to the measurement of the time error, it is of course also possible to measure the time interval between two successive burst signals directly and to subtract the known value $\frac{1}{2}T$ therefrom.

With respect to the generation of the servo signals, the invention is not limited to the integrating on/off control shown, proportional control being for example also possible.

The burst signals need not be signals which have been added to the recorded signal, but may also form part of that signal, for example, the vertical synchronizing pulses of video signals.

Apart from the system described with reference to FIGS. 1 to 5 for controlling the height of the two heads relative to each other in such a way that the two heads follow the correct tracks or groups of tracks, a video recorder may comprise a tracking system for centring each video head with respect to the correct track. In the case of such "fine controls" that control loop which cooperates with the head which at that instant scans a track is not always operative and the control loop which cooperates with the head which instantaneously effects no scanning is inoperative. When the scanning of a track by one of the two heads begins, a control signal with a specific initial value is then applied to the associated positioning means.

A suitable method of cooperation between the control system in accordance with such invention and the a fine control is to control the initial value in conformity with the control signal $S_{13}$. During each half revolution period that the relevant head 4 does not scan the tape, the initial value may be applied to the associated positioning element, while during the half revolution period in which the head 4 scans the tape, a fine control signal may be applied to the associated positioning means.

FIG. 6 shows a circuit for generating servo-signals $S_{19}$ and $S_{21}$ for controlling the positioning of the heads 4 and 5. The circuit comprises a device 33 for the generation of the servo-signal $S_{18}$ which controls the position of the head instantaneously scanning the tape relative to the centre of the track being read by that head, or which measures the position of this head relative to the centre of a specific track of a group of tracks and derives the signal $S_{18}$ therefrom. An example of such a circuit for "fine control" is described in Netherlands patent application No. 7409513, which has been laid open for public inspection, and also in Netherlands patent application No. 7702815 (PHN 8728). The output signal $S_{18}$ of fine control device 33 is applied to the positioning element 48 of head 5 via a resistor 37 and amplifier 43 and to the positioning element 49 of head 4 via a resister 38 and amplifier 44.

During the scanning of a track by head 4 or 5 the associated positioning element receives a servo-signal in order to cause said head to follow the centre of the track. The deviation of said head relative to a reference position at the end of a track will generally be different than at the beginning of a track, while generally the track will extend in such a way that the head position corresponding to the centre of the beginning of the next track relative to said reference position will not deviate appreciably from the initial position of the preceding track. For more rapidly centring the head relative to a following track it is therefore advantageous to give that head the same position at the beginning of a track as at the beginning of the preceding track. For this purpose the signal $S_{18}$ is sampled at the beginning of each track and the value is held so as to be applied to the associated positioning element during scanning of the next track by that head. To this end the signal $S_{18}$ is applied to capacitor $C_2$ or capacitor $C_1$ via the respective charging resistors 34 and 55 and the respective switches 35 and 36. Switch 35 or 36 is respectively controlled by a signal $S_{14}$ or $S_{15}$, in such a way that this switch is closed for some time, for example 1 ms, after the beginning of the scanning of a track by head 5 or 4, respectively. After this period the signal $S_{20}$ or $S_{13}$ across capacitor $C_2$ or $C_1$, respectively, will then have a value corresponding to the value of the signal $S_{18}$ during said period. This signal $S_{20}$ or $S_{13}$ is applied to amplifier 43 or 44, respectively via an amplifier 39 or 40, respectively, connected as a follower, and switches 41 or 42, respectively. Switch 41 or 42 is actuated by a signal $S_{16}$ and $S_{17}$, respectively, in such a way that the switch is open if head 5 or head 4 reads a track, and is closed between the reading of two tracks, so that during this period in which said switch is closed a signal corresponding to the signal $S_{20}$ or $S_{13}$, respectively, is applied to the respective amplifiers 43 and 44. As a result of the low-ohmic output of the follower amplifier 39 and 40 this signal corresponding to the signal $S_{20}$ or $S_{13}$, respectively, is predominant over the signal $S_{18}$ applied via resistor 37 and 38, respectively. As a result of this the signal $S_{20}$ or $S_{13}$, which corresponds to the value of the signal $S_{18}$ at the beginning of the preceding track read by said head, is applied to the associated positioning element 48 or 49, respectively, between the scanning of two tracks by the head 5 or 4, respectively.

In order to control the position of the head 4 relative to the head 5 when this position deviates by one track or a group of tracks, a switch 29 is included between resistor 55 and switch 36, which switch is actuated by the signal $S_{12}$. When the circuit of FIG. 4 generates an error signal $S_{12}$ (for example $S_{12}$ is in the logic "1" state), switch 29 connects switch 36 to the circuit 14, which supplies the signal $S_{11}$, via charging resistor $R_1$. The section 14, $R_1$, 29, $C_1$ of the circuit of FIG. 6 then corresponds to the section of the circuit of FIG. 4 bearing the same references, and in accordance with the error signal, capacitor $C_1$ is each time charged or discharged at the beginning of the scanning of a track by head 4 (switch 36 is then closed) and this signal $S_{13}$ on capacitor $C_1$ is applied to the positioning element 49 of head 4 after said track has been read, when switch 42 is closed. If there is no error signal (for example if the logic state of the signal $S_{12}$ is "0"), the switch 36 is connected to the circuit 33 via charging resistor 35 and at the beginning of each track read by the head 4 capacitor $C_1$ receives a signal in accordance with the signal $S_{18}$ at the beginning of said track and the initial-value fine control is consequently active.

Figure 7:
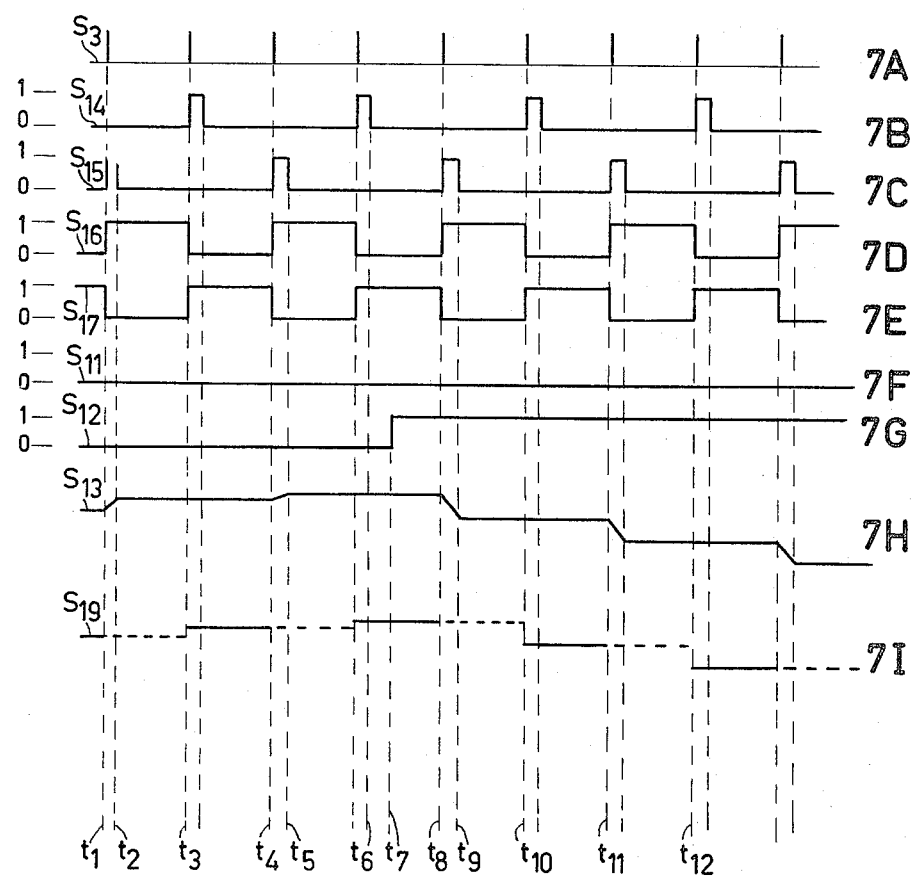

In order to explain the operation of the circuit of FIG. 6, FIG. 7 shows a number of signal waveforms, FIG. 7A showing a signal in which pulses appear simultaneously with the nominal beginning of the read-out of each track, for which purpose the signal $S_3$ (see FIG. 5) is selected in the present example. FIGS. 7B, 7C, 7D and 7E respectively show the signals $S_{14}$, $S_{15}$, $S_{16}$ and $S_{17}$, which actuate the switches 35, 36, 41, and 42 respectively, the logic "1" state indicating that the corresponding switch is closed and the logic "0" state that the associated switch is open. The signals $S_{14}$ to $S_{17}$ may for example be derived from the signal $S_3$ with a gate circuit 47. FIGS. 7F and 7G show the signals $S_{11}$ and $S_{12}$ obtained from the circuit of FIG. 4. FIG. 7H shows an example of a voltage $S_{13}$ across capacitor $C_1$ and FIG. 7G an associated servo signal $S_{19}$ for the positioning element 49.

In respect of the head 5 the operation is as follows. After every second pulse of the signal $S_3$, in FIG. 7 this is at the instant $t_3$ for the first time, switch 35 is briefly closed on command of the signal $S_{14}$ and the value of the signal $S_{18}$ is applied to capacitor $C_2$. During the scanning of a track by the head 5 (for example between the instants $t_3$ and $t_4$ in FIG. 7) switch 41 is open and the positioning element 48 receives the (amplified) signal $S_{18}$. When a track is being scanned by the head 4 (for example between the instants $t_4$ and $t_6$) switch 41 is closed on command of signal $S_{16}$ and the positioning element 48 receives the (amplified) value of the signal $S_{18}$ at the instant $t_3$.

The head 4 is controlled as a function of the signals $S_{11}$ and $S_{12}$, chosen by way of example, in the following manner:

At the instant $t_1$ the error signal $S_{12}$ is "0" and switch 29 is in the position shown in FIG. 6. At this instant head 4 starts scanning a track and switch 36 is closed on command of the signal $S_{15}$. During the period $t_1-t_2$ the signal $S_{13}$ assumes a value corresponding to the value of the signal $S_{18}$ and it retains this value until the appearance of the next pulse of the signal $S_{15}$ at the instant $t_4$. Between the instants $t_1$ and $t_3$ the positioning means 49 receives the amplified signal $S_{18}$ which is symbolically represented in FIG. 7I (signal $S_{19}$) by a dashed line. At instant $t_3$, when head 4 has reached the end of the relevant track, switch 42 is closed on command of signal $S_{17}$ until the instant $t_6$ at which head 4 starts to scan the next track. During said period $t_3-t_4$ the signal $S_{19}$ has a value corresponding to that of the signal $S_{13}$. This process is each time repeated on command of the signal $S_{15}$ as long as the signal $S_{12}$ is "0".

In the present example it is assumed that, for example as a result of a disturbance, the head 4 is positioned on a wrong track or a wrong group of tracks relative to the head 5. The signal $S_{12}$ becomes "1", the signal $S_{11}$ being representative of the polarity of the error. At this instant switch 29 is changed over and remains in this state as long as the signal $S_{12}$ is "1". At the instant $t_8$, upon the next pulse in the signal $S_{15}$ after the instant $t_7$, switch 36 is briefly closed and the signal $S_{11}$ is applied to the capacitor $C_1$, so that said capacitor discharges during the time $t_8-t_9$ during which the switch 36 is closed. From the instant $t_{10}$ at which the switch 42 is closed until the instant $t_{11}$ at which said switch opens again, the signal $S_{19}$ assumes a value corresponding to the signal $S_{13}$, so that the initial position of the head 4 is corrected in accordance with the polarity of the error (signal $S_{11}$) to an extent determined by the charging resistor $R_1$ and the capacitance $C_1$. Between the instants $t_{11}$ and $t_{12}$ the servo signal $S_{18}$ is applied to the positioning means 49. This process is repeated each time after the occurrence of a pulse in the signal $S_{15}$ as long as the signal $S_{12}$ is "1".

The device shown controls the position of the one head relative to the other head upon the occurrence of an error signal. In principle, it is also possible to control the two heads to the same extent relative to each other, for example, by making the circuit between the circuit 33 and the positioning means 48 identical to the circuit between the circuit 33 and the positioning means 49, but with the application of the inverted signal $S_{11}$, so that said head 5 is controlled in a sense opposite to that of the head 4.

In systems in which the tracks within a group of tracks contain tracking signals which differ for example in respect of frequency, as the system described in Netherlands patent application 7702815 (PHN 8728) where each time four consecutive tracks contain tracking signals of different frequencies, a system in which the coarse control controls the two heads towards each other to the same extent is not possible without taking special steps. Indeed, in such a system the fine control detects tracking errors within each group, for example an error of two tracks, but not an error of the magnitude of the group of tracks. If such an error occurs, in the present example an error of four tracks, and if the two heads are controlled towards each other to the same extent, these heads are controlled towards a position with an error corresponding to two tracks. However, the fine control mechanism will attempt to adjust the two heads in opposite directions over two tracks, so that the fine control mechanism and the coarse control mechanism keep counteracting each other. A solution may be to adjust the fine control mechanism by two tracks in the event of a group error. However, the system described yields no problems. In the case of an error corresponding to one group (4 tracks) the two heads occupy a position which is correct for the fine control mechanism. Correction of one of the heads over one group (4 tracks) leads to a position which is also correct for the fine control.

What is claimed is:

1. A method of controlling the position of a pair of reproducing elements in an apparatus for reproducing signals recorded in a plurality of parallel tracks on a recording medium, said reproducing elements and said medium being arranged for movement relative to each other so that said elements consecutively read alternate tracks and the signals recorded in the tracks containing pilot signals such that the pilot signals from each pair of consecutively read tracks are spaced from each other by a predetermined, nominal time interval when the reproducing elements are spaced from each other by a predetermined, nominal distance in a direction transverse to the track direction, said method comprising the steps of:
    detecting the pilot signals read from said tracks by said reproducing elements;
    measuring the time interval between the pilot signals detected from each pair of consecutively read tracks;
    determining the difference between said measured and nominal time intervals, said differance being indicative of the deviation of the distance between said reproducing elements in said transverse direction from said nominal distance; and
    correcting the position of said reproducing elements relative to each other in the direction transverse to the track direction when said difference exceeds a predetermined amount.

2. The method according to claim 1 wherein said recording medium is a tape and the tracks extend obliquely relative to the longitudinal axis of the tape.

3. The method according to claims 1 or 2, wherein said measuring step includes the steps of:
    generating a series of reference signals spaced from each other by said nominal time interval;
    measuring the duration of a first time interval between one of said reference signals and the pilot signal detected from a first one of a given pair of consecutively read tracks; and
    measuring the duration of a second time interval between the next succeeding reference signal and the pilot signal detected from the second of said given pair of consecutively read tracks; and
    said step of determining includes comparing said first and second time intervals to obtain said difference indicative of the deviation of the distance between said reproducing elements in said transverse direction from said nominal distance.

4. The method according to claim 3 including the step of producing a first signal when said difference between the durations of said first and second time intervals exceeds said predetermined amount and producing a second signal representative of the polarity of said difference.

5. In an apparatus for reproducing signals recorded in a plurality of parallel tracks on a recording medium, said apparatus including a pair of reproducing elements arranged for relative movement with respect to said medium so as to consecutively read alternate tracks on said medium, the improvement wherein the signals recorded in said tracks contain pilot signals such that the pilot signals from each pair of consecutively read tracks are separated by a predetermined, nominal time interval when the reproducing elements are spaced from each other by a predetermined, nominal distance in a direction transverse to the track direction, the improvement further comprising means for detecting the pilot signals read by said reproducing elements from said tracks, means for measuring the time interval between the pilot signals detected from each pair of consecutively read tracks, means for comparing said measured time interval with said nominal time interval, and means for generating a control signal indicative of the deviation of the distance between said reproducing elements in said transverse direction from said nominal distance when said measured time interval deviates from said nominal time interval by a predetermined amount.

6. The apparatus according to claim 5 wherein said recording medium is a tape and the tracks extend obliquely relative to the longitudinal axis of the tape.

7. The apparatus according to claims 5 or 6 wherein said control signal is indicative of the magnitude of said deviation of said distance between said elements from said nominal distance and wherein said control signal generating means includes means for producing a first signal indicative of the polarity of that deviation.

8. The apparatus according to claims 5 or 6 wherein said control signal generated by said control signal generating means has a first level when said deviation of said distance is of a first polarity and a second level when said deviation of said distance is of a polarity opposite to said first polarity, and including means for integrating said control signal and means for applying said control signal to said integrating means when said deviation of said measured time interval from said nominal time interval exceeds said predetermined amount.

9. The apparatus according to claim 8 including means responsive to said control signal for controlling the position of each of said elements relative to the other in said transverse direction and switching means for applying said control signal to said position controlling means, said switching means being open during the time interval that the element controlled by said position controlling means is reproducing signals from said medium.

10. The apparatus according to claim 5 wherein said recording medium is a tape and the tracks extend obliquely relative to the longitudinal axis of the tape.

11. In an apparatus for reproducing signals recorded in a plurality of parallel tracks on a recording medium, said apparatus including a pair of reproducing elements arranged for relative movement with respect to said medium so as to consecutively read alternate tracks on said medium, the improvement wherein the signals recorded in said tracks contain pilot signals such that the pilot signals from each pair of consecutively read tracks are separated by a predetermined, nominal time interval when the reproducing elements are spaced from each other by a predetermined, nominal distance in a direction transverse to the track direction, the improvement further comprising means for detecting the pilot signals read by said reproducing elements from said tracks, first means for generating a first series of pulses which are spaced from each other by time intervals equal to said nominal time interval, means for measuring the difference between the duration of a first time interval between one of said pulses of said first series and a first pilot signal detected from a first one of a pair of consecutively read tracks and the duration of a second time interval between the next succeeding pulse of said first series and a second pilot signal detected from the second of said pair of consecutively read tracks, and means for generating a control signal indicative of the deviation of the distance between said reproducing elements in said transverse directional from said nominal distance when said difference exceeds a predetermined value.

12. The apparatus according to claims 11 or 10 wherein said control signal is indicative of the magnitude of said difference and wherein said control signal generating means includes means for producing a first signal indicative of the polarity of said difference.

13. The apparatus according to claim 11 wherein said detecting means includes second means for generating a second series of pulses in synchronism with the detected pilot signals such that the pulses of said second series correspond to said detected pilot signals and are spaced from each other by time intervals equal to the time intervals between the detected pilot signals, and said first time interval measured by said measuring means is the interval between said one pulse of said first series and a pulse of said second series associated with said first pilot signal and said second time interval is the interval between said next pulse of said first series and a pulse of said second series associated with said second pilot signal.

14. The apparatus according to claim 13 wherein said measuring means includes means for generating counting pulses whose repetition rate is comparatively high relative to the repetition rate of the pulses generated by said second generating means, a reversible up-down counter for counting said counting pulses, and first means for applying said counting pulses to said counter during said first and second time intervals so that said counter counts said counting pulses in a first counting direction during said first time interval and counts said counting pulses in the opposite direction during said second time interval.

15. The apparatus according to claim 14 wherein said measuring means includes a bistable device having a set and reset input and an output, second means for applying the pulses of said first series to one of said inputs and the pulses of said second series to the other of said inputs and means for coupling said output of said bistable device to said first applying means so that said counting pulses are applied to said counter by said first applying means in response to a signal at the output of said bistable device.

16. The apparatus according to claims 14 or 15 including means coupled to said counter for generating a first signal when the count of said counter upon termination of each second time interval deviates to a predetermined extent from a reference value corresponding to said nominal time interval and means for generating a second signal indicative of the polarity of said deviation.

17. The apparatus according to claim 16 including means for generating a third signal at the end of each of said second time intervals and means coupled to said third signal generating means for storing the values of said control signal upon appearance of said third signal until the appearance of a subsequent third signal and means for applying said stored values to an element for controlling the position of said reproducing elements relative to each other.

18. The apparatus according to claim 17 including means coupled to said storing means for inhibiting application of said stored values to said position controlling element when the count of said counter exceeds a predetermined limit.

* * * * *